United States Patent [19]

Reding

[11] Patent Number: 4,943,157

[45] Date of Patent: Jul. 24, 1990

[54] FIBER OPTIC TRIANGULATION GAGE

[75] Inventor: Bruce W. Reding, Elmira, N.Y.

[73] Assignee: Corning Incorporated, Corning, N.Y.

[21] Appl. No.: 353,500

[22] Filed: May 18, 1989

[51] Int. Cl.$^5$ ............................ G01C 3/00; G01C 5/00
[52] U.S. Cl. ................................................. 356/1; 356/2;
356/4; 356/376
[58] Field of Search ............................ 356/1, 4, 376, 2

[56] References Cited

U.S. PATENT DOCUMENTS

| | | | |
|---|---|---|---|
| 3,792,928 | 2/1974 | Poilleux | 356/4 |
| 4,201,475 | 5/1980 | Bodlaj | 356/1 |
| 4,373,804 | 2/1983 | Pryor et al. | 356/1 |
| 4,453,083 | 6/1984 | Bohlander et al. | 356/4 |
| 4,645,917 | 2/1987 | Penney et al. | 356/376 |
| 4,647,209 | 3/1987 | Neukomm et al. | 356/1 |
| 4,766,323 | 8/1988 | Franklin et al. | 356/1 |
| 4,789,243 | 12/1988 | Mathur | 356/1 |

Primary Examiner—Stephen C. Buczinski
Attorney, Agent, or Firm—Alfred L. Michaelsen

[57] ABSTRACT

Methods and apparatus for determining the curvature of a surface by use of multiple discrete triangulation sensors are described. Robustness in the face of an extreme manufacturing environment is achieved by placing a triangulation light source and a detector at a remote, environmentally controlled location. Light is relayed from the remote source to each sensor head by a single mode optical fiber, which then projects a spot onto the surface under consideration. An image of the spot is formed in each sensor head, and is relayed back to the remote detector by a coherent bundle of fibers. Range to the surface at each sensor head is inferred by the position of each image as relayed by the coherent bundles, while curvature of the surface is determined by comparing ranges as measured at each sensor head. The optics contained in each sensor head are adapted to work well with specular, diffuse, opaque or transparent surfaces.

21 Claims, 6 Drawing Sheets

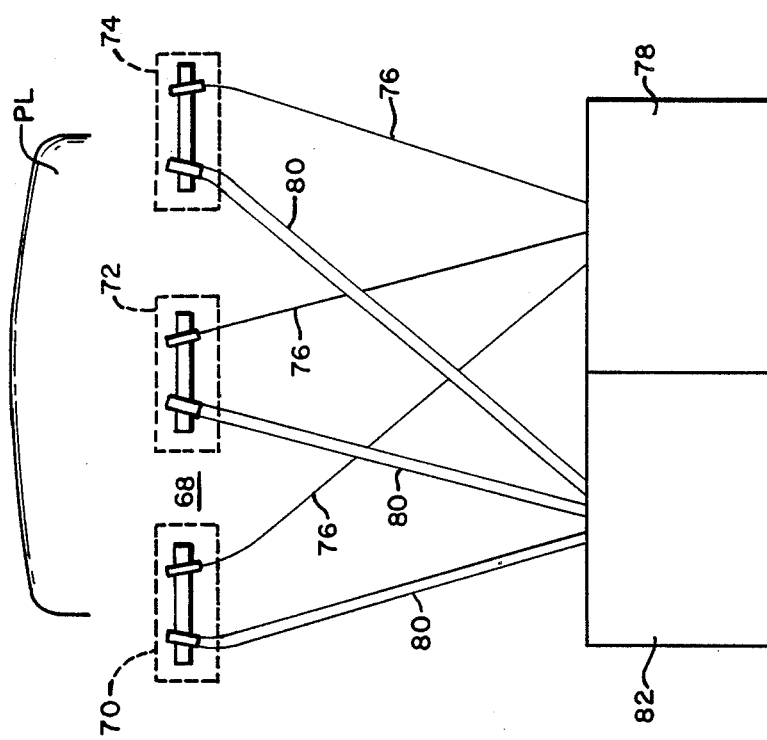

FIBER OPTIC TRIANGULATION GAGE

BACKGROUND OF THE INVENTION

Field of the Invention

The present invention is related generally to methods and apparatus for measuring distances to a surface without contacting that surface, and more particularly to non-contact methods and apparatus for measuring curvature of a molded glass surface immediately after such surface has been formed.

Statement of the Prior Art

In order to monitor and control the manufacture of molded glass television panels, it becomes necessary to periodically measure certain parameters of the panels such as their inside surface curvature. These measurements have in the past been accomplished typically by contacting sensors such as linear variable differential transformers, i.e., an "LVDT". One major drawback that is associated with such known measuring methods and apparatus, however, is that these contacting sensors can cause irreparable damage due to mechanical and/or thermal shock of the freshly-molded glass panels. Within the television panel manufacturing industry, therefore, it has become desirable to provide an alternative, method and apparatus for measuring those certain parameters of the panels.

Various implementations of a known technique referred to as triangulation ranging have been proposed. In most such implementations, as is illustrated in FIG. 1, a source of light 10, typically a laser, laser diode, or light emitting diode, is used in conjunction with beam shaping optics to project a light spot L onto the object surface S for which range information is desired. A receive detector, typically a position sensitive diode, linear array, or area array, 14 is offset somewhat from light source 10 and is used, in conjunctions with a lens 12, to respond to the light which is backscattered from the object. For a given distance to the object surface S, the image formed from the backscattered light will fall only on one location on detector 14.

Illustrative of such known apparatus which are used for triangulation ranging are models LC-2010 and PA-1800U/1801U optical displacement sensors manufactured by Keyence Corp. of America, Torrance, CA; model MV-300 manufactured by Perceptron of Farmington Hills, MI; models 300, 400 and 600 manufactured by Diffracto Ltd. of Troy, MI; models PRS-150, PRS-400, PRS-800 and PRS-1600 manufactured by CyberOptics Corporation of Minneapolis, MN; Optocator model 2203-503 manufactured by Selcom Selective Electronic Group; Fiberscan model FS manufactured by Optical Technologies, Inc. of Herndon, VA; model HVS-100 manufactured by Honeywell Visitronics of Englewood, CO; and model OP2 manufactured by Renishaw, Inc.

One important style of triangulation ranging which should be noted at this juncture is specular triangulation ranging. While each of the above-noted sensors can be placed at any orientation relative to the object surface, they typically work best when the light source is perpendicular to the object surface. In such position, the lens in front of the receive detector will collect diffusely scattered light, which will tend to be fairly uniform over the lens aperture. Given uniform illumination, imperfect focusing or aberrations in the lens will manifest themselves as a constant location error of the spot on the detector that may be calibrated out.

For the reasons which are detailed herein below, however, some applications require the triangulation gage to be positioned such that the lens collects the specularly reflected light. In this configuration, the input aperture of the collecting lens typically has some of its parts strongly illuminated and other parts weakly illuminated. Distribution of strong versus weak illumination varies due to minor variations in the condition and/or angle of the object surface.

Given this non-uniform, variable illumination of the lens, imperfect focussing or aberrations will manifest themselves as variable location errors of the spot on the detector, resulting in variable ranging errors given minor variations in the object's surface condition or angle. Therefore, in order to avoid imperfect focussing and aberrations, more stringent demands must be placed upon the optics of a sensor intended for use in a specular configuration. Model PRS-30 manufactured by CyberOptics Corporation of Minneapolis, MN is illustrative of an apparatus intended for specular applications.

Another important style of triangulation ranging is that in which the range information is gathered along a line or over an area of a surface by means of scanning the light source in one or two dimensions. LRS series sensors manufactured by the CyberOptics Corporation of Minneapolis, MN and model LSG-3010 manufactured by Chesapeake Laser Systems, Inc. are illustrations of known apparatus for line range sensing, while the "Three Dimensional Imaging Method and Device" as described in U.S. Pat. No. 4,627,734 is an illustration of a known apparatus for area range sensing.

During the production of molded glass television panels, however, the usage of such known apparatus for triangulation ranging is obviated for one or more of the following reasons: (1) ambient heat; (2) sensor size; and (3) electromagnetic interference (EMI) as is discussed in greater detail herein.

Immediately after its removal from the mold, the temperature of a glass television panel is typically in excess of 500° C. A conventional triangulation sensor with a standoff of approximately four inches would, thus, be subjected to a great deal of ambient heat through convection and radiation. Such heat would most likely damage or unacceptably degrade the performance of all known available sensors, since those sensors generally have an operating range of from about 0° C. to about 50° C.

One way of solving this problem would be to surround the sensor with a cooling system such as a water jacket. Such a jacket, however, increases the overall size of the sensor, which is undesirable for the reasons discussed herein as well as its mechanical complexity. Another way to reduce the problems associated with such a high ambient heat would be to construct the sensor with a long standoff. However, for a given angle between the source of light and the detector, the size of the sensor would increase proportionally with its increasing standoff, again resulting in an undesirably large sensor.

Immediately after its removal from the mold, the surface contour of the glass television panel would be rapidly changing due to thermal shrinkage. Additionally, severe ambient vibrations are present in the manufacturing environment which cause rapid motion of the surface. Under such circumstances, one cannot reliably measure the surface contour by scanning it with a single sensor. Instead, one must employ a plurality of sensors simultaneously to "freeze" the surface of the glass television panel at a moment in time. Therefore, small sensors are desirable for such simultaneous use since they would allow more points to be measured upon the surface of the glass.

A number of cleverly miniaturized sensors are available. An example of such a sensor is the PRS series manufactured by CyberOptics Corporation of Minneapolis, MN. As is described in U.S. Pat. No. 4,733,969, for example, such PRS-type sensors incorporate a light source, imaging lens, and detector. Thereafter, signals from the detector are transmitted via ribbon cable to processing electronics that are remotely located. Remote placement of the processing electronics permits substantial reduction in the size of the sensor head. However, in reducing the sensor head size, the sensor standoff is reduced as well, thereby exacerbating the ambient heat problem noted above.

Other known small sensors are the Laserprobe models 400 and 600 manufactured by Diffracto Ltd. of Troy, MI, which have a relatively small standoff. In this respect, reference is made to U.S. Pat. No. 4,574,199. In general, small sensors having a small standoff will be especially vulnerable to heat from the glass.

It is common in processing glass to have high power electrical devices in close proximity to the manufacturing line. This is especially true in glass television panel fabrication which utilizes electromagnetic induction (EMI) heating for certain process steps. As is readily apparent, electromagnetic induction heating makes any electronic devices, e.g., triangulation ranging sensors, in the area especially susceptible to EMI.

The CyberOptics PRS series sensors noted herein avoid such heating problems by remotely locating most electronics. However, the detector used in such PRS-type sensors is located in the sensor head and is, therefore, especially sensitive to EMI.

Another known sensor which goes a step further in removing its electronics from the sensor head is the Optech Fiberscan manufactured by Optical Technologies, Inc. of Herndon, VA. In these Fiberscan sensors, the detector is remotely located and the light spot is relayed to it using a linear array of optical fibers. However, these Fiberscan sensors do not use a remote source of light, using instead a source of light that is located in the sensor head, thereby making it susceptible both to EMI and ambient heat.

In view of the preceding limitations of known triangulation ranging sensors, it is an object of the present invention to provide non-contacting methods and apparatus for determining the curvature of an object surface which are resistant to heat, vibrations, and EMI.

SUMMARY OF THE INVENTION

Improved methods and apparatus are achieved in accordance with the present invention by a triangulation gage which uses fiber optic means to obtain a small sensor size, as well as being resistant to ambient heat and EMI. A light source, preferably a laser, projects light into first fiber optic means which conducts the light to a remotely located collimating lens in a sensor head. The first fiber optic means preferably comprises a single optical fiber, and even more preferably a single-mode optical fiber due to its action both as a conductor of light and a fixed spatial filter. Moreover, the first fiber optic means includes an armored oversheath to conventionally guard such first fiber optic means against breakage and other environmental hazards.

The output light from the first fiber optic means is collected by the collimating lens, which is preferably a gradient index or "GRIN" lens, and is projected towards the surface under consideration to form a spot of light thereon. Light backscattered from the surface is collected by a second, offset lens which then forms an image of the spot of light. Second fiber optic means, comprising a regular two-dimensional arrangement of optical fibers known as a coherent bundle, collects this image and relays it to remotely located detector electronics. The image at output face of the coherent bundle is relayed to a detector, preferably a linear array, either by means of directly coupling the coherent bundle to the linear array, or by using intermediary relay optics.

A side-to-side position of the image on the detector is determined by suitable position estimating means, and the range to the surface under consideration is inferred using this position. The output end of the first fiber optic means, the collimating lens, the collecting lens, and the input end of the second fiber optic means, are all suitably fixtured in a common block and comprise the sensor head.

In accordance with one embodiment of the present invention, three such sensor heads are disposed along a diagonal axis of the surface under consideration, so that an overall curvature of such surface may be crudely characterized. Alternatively, additional sensor heads can be provided to more densely sample the surface under consideration. Preferably, five sensor heads are provided, arrayed along both diagonal axes, and even more preferably nine sensor heads, arrayed in three rows of three.

An even more dense sampling may be provided as need dictates and space allows. In all embodiments of the invention which utilize more than one sensor head, a single light source may be shared among all of the sensor heads by means of introducing a standard fiber optic splitting device in the first fiber optic means. Similarly, a single detector could be shared among many or all of the sensor heads although this is technically more difficult.

Since each sensor head contains only passive, relatively sturdy components, and since all other optics and electronics are remotely located, it has been found that apparatus in accordance with the present invention withstands the ambient heat, EMI, and other hazards found in the manufacturing environment typical of molded glass television panels. In the present apparatus utilizing multiple sensor heads, the sharing of the light source and detector/electronics results in additional sturdiness by virtue of reducing the number of sensitive components exposed to such environmental hazards.

These and additional objects, features and advantages of the present invention will become apparent to those skilled in the art from the following detailed description and the accompanying drawings, which is incorporated in and constitutes part of the present specification, on which, by way of example, only the preferred embodiments of this invention are illustrated.

BRIEF DESCRIPTION OF THE DRAWINGS

FIG. 6 is a diagrammatic illustration of a simple multiple sensor head arrangement which allows curvature of the surface under consideration to be measured.

DETAILED DESCRIPTION OF THE INVENTION

It is to be noted that the drawings are illustrative and symbolic of the present invention, and there is no intention to indicate scale or relative proportions of the various elements shown therein.

Figure 1:
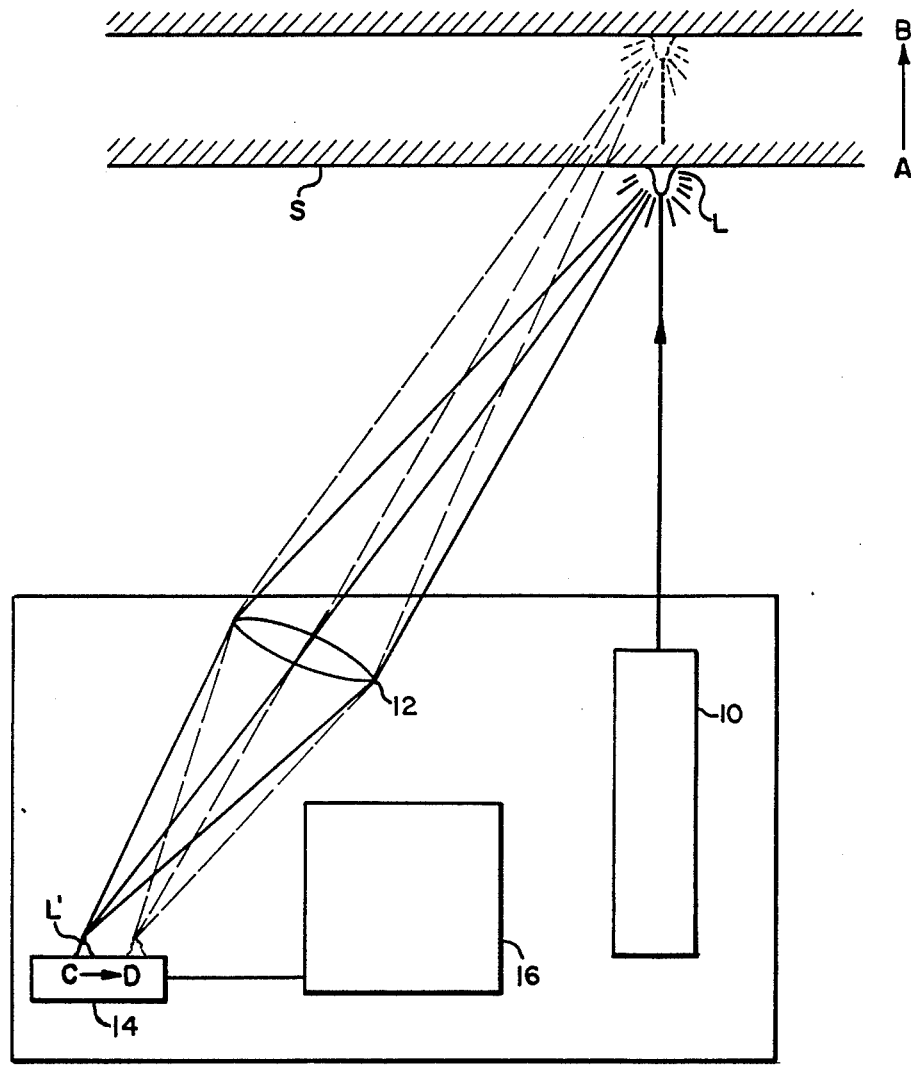
FIG. 1 is a schematic illustration of one known method of triangulation utilizing conventional optical means.

Referring to the drawings, wherein like characters designate like or corresponding parts throughout each of the several views, there is shown in FIG. 1 a known method of triangulation ranging which utilizes conventional optical means. A source of light 10, usually a laser, is used to project a spot of light L upon a surface S. Light is backscattered from the surface S, and a portion of such light is collected by a lens 12 to form an image L' of the spot L on a detector 14. Conventional signal conditioning electronics 16 are then used to determine the side-to-side position of the image L' on detector 14. If, as shown in FIG. 1, the surface S moves from A to B, the image L' on the detector 14 moves from point C to point D. In this manner, the position of the image L' on the detector 14 can be used to infer range to the surface S.

As is depicted in FIG. 1, surface S is a diffuse scatterer. This means that the incoming beam of light from the laser 10 can be incident at a relatively large range of angles, and lens 12 will still collect backscattered light. Such a diffuse surface S additionally implies that the entire input aperture of lens 12 will be relatively uniformly filled. Glass surfaces such as television panels, however, are not typically diffusely reflective.

Depending upon the particular forming process that is used to manufacture glass, the energy of the light which is diffusely backscattered from a glass surface can be four or more orders of magnitude less than the energy of the light which is specularly backscattered. Thus, for the measurement of molded glass television panels or other such glass articles, a specular configuration, such as that shown in FIG. 2, is necessary for triangulation ranging.

Figure 2:
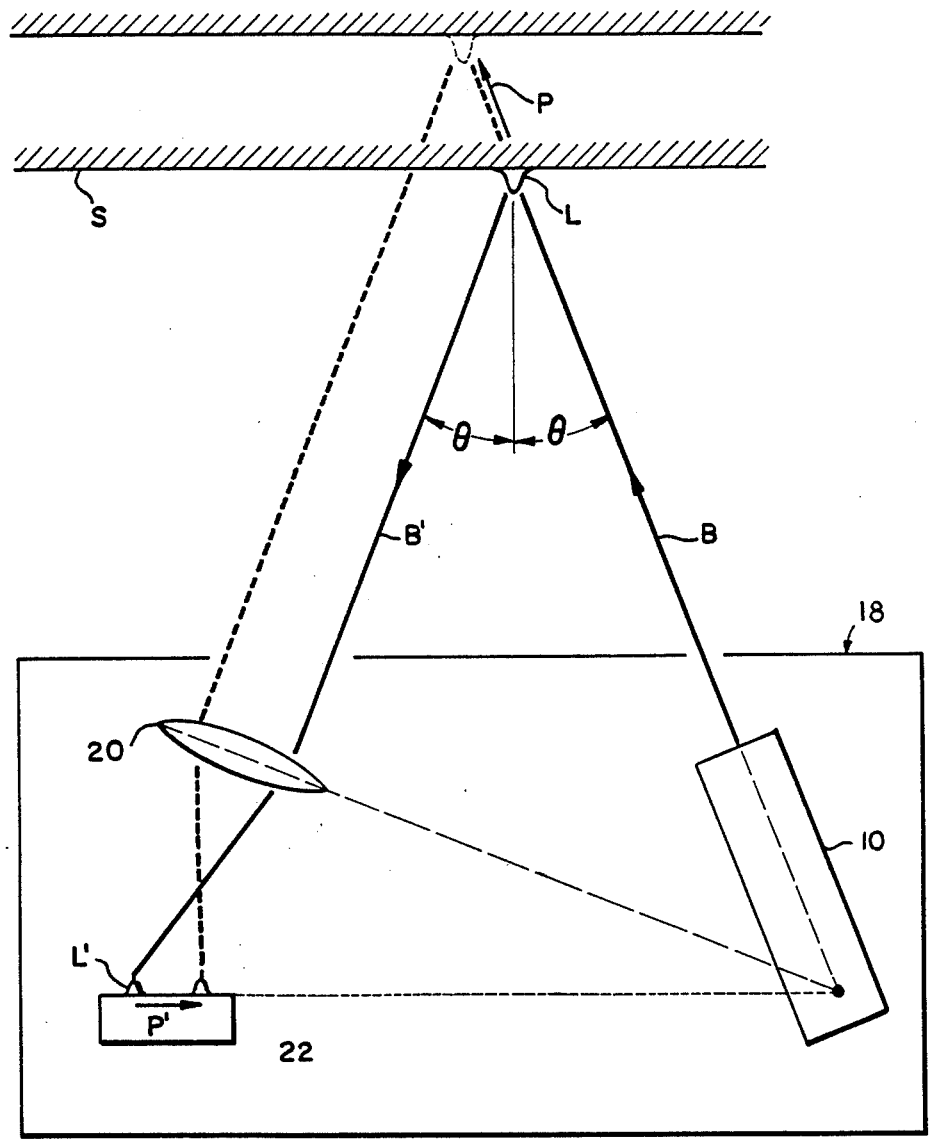
FIG. 2 is a schematic illustration of a triangulation sensor employed in a specular configuration.

As shown in FIG. 2, sensor 18 and surface S are positioned relative to each other so that the specular reflection B' of a beam of light B from the light source 10 enters a collecting lens 20. As can be readily seen, collecting lens 20 will not typically have its input aperture uniformly filled. Instead, backscattered beam B' passes through a small section of lens 20, the exact location of which will vary given varying angles and conditions of surface S. Due to this variable, non-uniform light distribution at the input aperture of lens 20, performance requirements of the collecting optics in specular triangulation gages are more exacting in at least two ways as discussed hereafter.

First, lens 20 must be relatively free of aberrations. If aberrations were present, changes in the position or distribution of B' at the input aperture of lens 20, which were not related to range changes of surface S, would manifest themselves as a sideways motion of image L' on detector 22, thereby causing a ranging error. Accordingly, coma and spherical aberrations should be minimized. As will be explained hereafter, field curvature may also be minimized. Distortion, however, is of little or no consequence, since it only produces non-linearities that may be calibrated out. Astigmatism is also inconsequential since only sideways motion of the image L' on the detector 22 will lead to ranging errors. Finally, assuming that light source 10 comprises a relatively monochromatic source, as for example, a laser, chromatic aberrations will have no effect.

Second, detector 22 must be precisely placed at the focus of L' If detector 22 is positioned in front of or behind the focus point, in a manner similar to that of aberrations, tilting of surface S would cause ranging errors. Since L' will then move along path P' as surface S moves through its range, path P' must be straight to allow detector 22 to be placed at the precise focus of L' at all points along that path. The requirement of such path straightness is the factor necessitating minimizing field curvature of lens 20.

In accordance with one important aspect of the present invention, notice should be taken that path P' is not parallel to the midplane of lens 20. In general, the positioning of the path P' can best be approximated by use of the Scheimpflug condition, which requires that the object path P, the midplane of lens 20, and the image path P', if extended as shown in FIG. 2, intersect at a common point. The requirement of collecting image L' at a precise focus necessitates that detector 22 be placed along this same tilted path P'.

As will become more apparent from the detailed discussion hereinafter, these requirements have certain implications on the design and placement of the lens 20, as well as the arrangements made for the collection of beam B'. It should also be noted that, since these optical requirements are more stringent for specular triangulation gages than for diffuse triangulation gages, the specular triangulation gage as described herein will work well in diffuse applications even though the converse would not necessarily be true. Thus, while the present invention is directed primarily to methods and apparatus for measuring the range to a specular surface, it will with a suitable increase in the power of the light source, also work well in diffuse applications.

Figure 3:
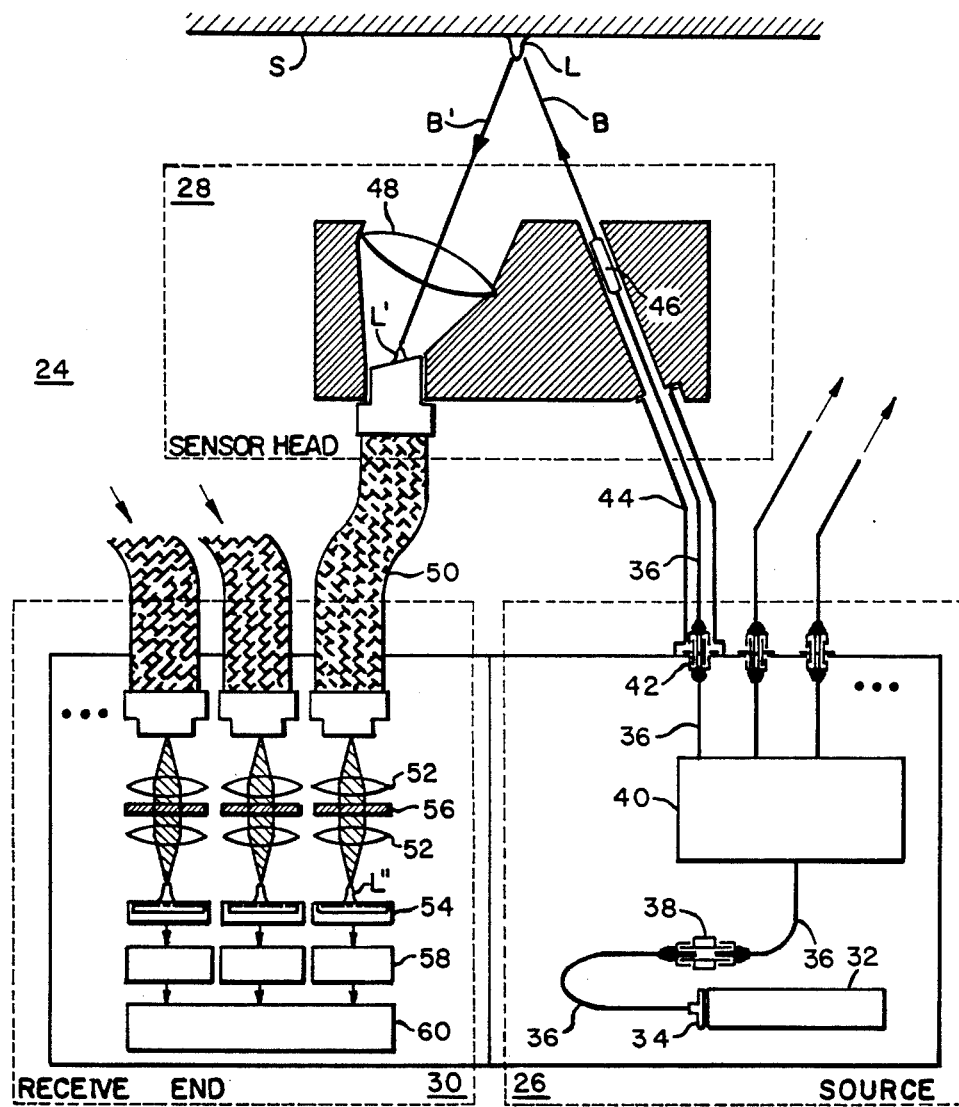
FIG. 3 is illustrative in greater detail of the triangulation sensor in accordance with a one embodiment of the present invention.

Referring now to FIG. 3, it can be seen that a triangulation sensor 24 according to one embodiment of the present invention comprises generally a light subsystem 26, one or more sensor heads 28, and a receive subsystem 30. The light source subsystem 26 includes a source of light 32, means 34 for coupling source 32 to an optical fiber 36, means 38 for adjusting the level of the light supplied to the fiber 36, means 40 for splitting the beam of light supplied by source of light 32 into a plurality of beams of substantially uniform intensity, and frequency, and means 42 for coupling the beam splitting means 40 to the one or more sensor heads 28.

The source 32 preferably comprises a laser, and more preferably comprises a laser that provides a visible beam B of monochromatic light. In a presently preferred embodiment of this invention, source 32 comprises a conventional He-Ne laser. Visibility of the light provided by the laser facilitates setup and maintenance of the optics, while its monochromaticity provides extremely good rejection of ambient light at the detection end with the use of appropriate filters. While a He-Ne laser is the preferred source of light 32, it will be understood that the present invention may also be practiced through use of a laser diode or light-emitting diode as long as the beam B of light provided by such source 32 is monochromatic, and preferably visible.

Coupling means 34 preferably comprises any conventional laser-to-fiber coupler such as a lens which is mounted on the front of laser 32 to focus the light provided therefrom into the fiber 36. In the case where a laser diode is utilized as source 32, coupling means 34 could be alternatively accomplished by using a common technique known as "pigtailing", i.e., where fiber 36 is attached directly to the laser diode.

Fiber 36 is used to guide light provided by source 32 to one or more sensor heads 28. Preferably, fiber 36 comprises a fiber which is single mode at the wavelength of the source 32. If a multimode fiber was used, any bending of the fiber would change the power distribution of the light among the modes, thereby causing a change in the shape of the spot of light L thus resulting in a ranging error. With a single mode fiber, however, the power distribution of the light, and therefore the shape of the spot L, would be independent of any fiber bending since there is only one conducting mode.

In accordance with another important aspect of the present invention, the light source subsystem 26 becomes an angularly fixed source by using a single mode fiber 36. That is, the angle of a beam of light from a laser can slowly vary by tenths of milliradians. As is readily apparent from FIGS. 1 and 2, such an angular variation would cause the light spot L to move sideways on the surface S, leading to an erroneous detection of surface motion.

With a single mode fiber 36, however, the cross-sectional power distribution of light in the core of such fiber 36 is completely fixed after a few centimeters of travel within the fiber, thereby making the cross-sectional shape of the output beam B independent of the input light characteristics. Thus, by using a single mode fiber 36, system 24 is desensitized to angle variation out of the light source 32 to remove a major source of calibration drift existing in most triangulation gages.

According to a presently preferred embodiment of this invention, means 38 for adjusting the level of the light supplied to fiber 36 comprises an attenuator, and more preferably comprises a variable attenuator, either of the variable gap type, or the variably blocked expanded beam type, both of which are conventional and readily available.

Beam splitting means 40 comprises a beam splitter which accepts light from the input fiber 36, and evenly distributes such light to each of the one or more sensor heads 28. Such a beam splitter allows one light source to be shared by all of the sensor heads 28, thereby reducing the size, complexity, and cost of system 24. In addition, the use of a beam splitter accrues significant optical advantages, since it strips cladding light from fiber 36.

As is well understood by one familiar with the art, cladding light is light which travels outside of the fiber core. This light is loosely bound and typically attenuates to insignificance in a few hundred meters. In the present application, however, where only a few meters of fiber is being used, the cladding light remains significant, and results in a superposition of bend-sensitive spatial noise on the light spot L. The placement of such beam splitting means 40 in the fiber path removes this cladding light. Moreover, it has been found empirically that by using a beam splitter, spatial noise and hence fluctuations in the measured range are reduced by an order of magnitude.

Coupling means 42 comprises a connector which allows a modular design in which sensor heads 28 may be changed and/or replaced as application and maintenance needs dictate. In accordance with a current preferred embodiment of the present invention, such coupling means 42 comprises a conventional FC type connector, although any single mode connector would be suitable.

Each of the one or more sensor heads 28, as noted hereinabove, is connected to light source subsystem 26 by respective fibers 36, which are preferably protected by an armored oversheath 44. Fiber 36, thus, relays the light from the light source subsystem 26 to sensor head 28 where it is collected by suitable lens means 46. Such lens means 46 comprises, in accordance with a presently preferred embodiment of this invention, a gradient index or "GRIN" lens, although standard optics could be used in its place. The light that is collected by lens means 46 is thereafter projected as a beam B, ultimately forming a spot L of light on surface S.

Backscattered light B' from surface S is then collected by another lens means 48, located in sensor head 28 in operable relationship with lens means 46, to form an image L' on the input face of a coherent bundle 50 which is also suitably protected by an armored oversheath. As was discussed in connection with reference to FIG. 2, the lens aberrations of lens means 48 should be such that the location of L' is invariant given small changes in the angle or condition of surface S which do not result in a range change at L. Therefore, the specific requirements of minimum spherical aberration and field curvature are suitably met with appropriate lens design, while the requirement of minimum coma is met by positioning lens means 48 so that light spot L is on or substantially close to the optical axis of such lens means 48.

Each of the coherent bundles 50 collects image L' formed by its respective lens means 48. However, in accordance with another important aspect of the present invention, it should be noted that the input face of the coherent bundle 50, that is, where image L' is formed, is not parallel to lens means 48, rather lies in the Scheimpflug plane as defined hereinabove. The particular disposition of the input face of coherent bundle 50 will be discussed in greater detail with reference to FIGS. 4a and 4b.

Figure 4A:
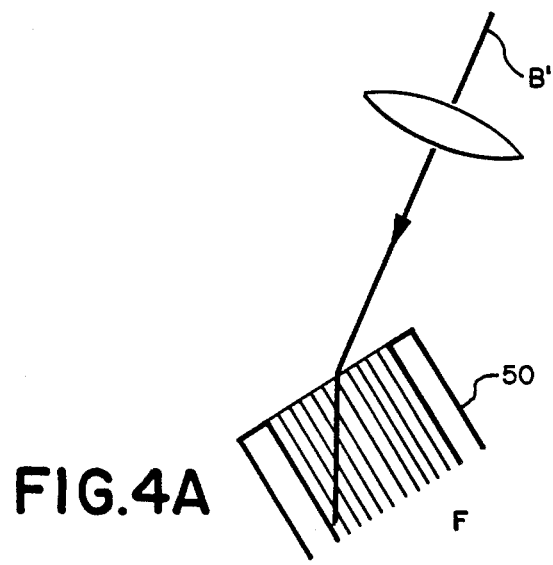
FIGS. 4a and 4b illustrate fiber skewing, relative to the input face of a coherent bundle, facilitating guidance of an image by a bundle.

Referring first to FIG. 4a, a standard coherent bundle 50 is shown. That is, if one were simply to take such a standard coherent bundle 50, with its input face perpendicular to the optical axes of the contained fibers F, and place it along P', FIG. 2, then the beam B' may be incident upon the input face at too large an angle to be guided by fibers F. Even if the beam B' is guided into the standard coherent bundle 50 as shown in FIG. 4a, most of the energy will travel in loosely bound higher order modes which are more sensitive to any bending of such coherent bundle 50.

Figure 4B:
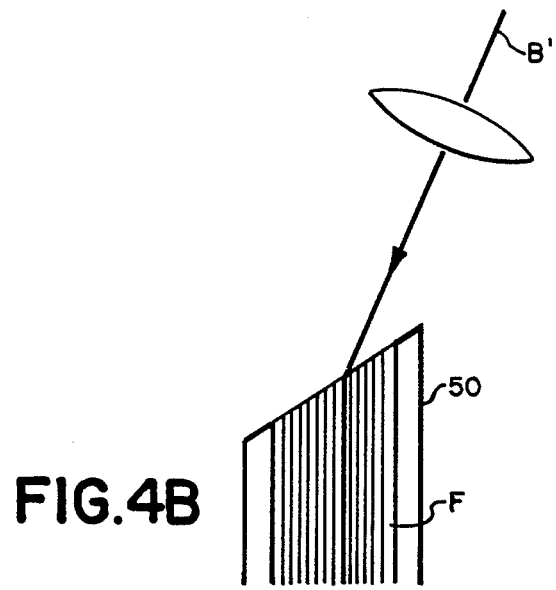

However, and referring now to FIG. 4b, this no-guide/loosely guided condition can be solved in accordance with another important aspect of the present invention by utilizing a coherent bundle 50 having an input face that is not perpendicular to the fiber axes. As is shown in FIG. 4b, if fibers F are appropriately angled relative to the input face, they will then be parallel or substantially close to parallel to B' after refraction at the air/glass boundary of the input face, thereby easily guiding B'. In other words, the non-perpendicular aspect of input face of coherent bundle 50 shown in FIG. 4b will skew the numerical aperture of fibers F such that B' lies well within the acceptance cone of those fibers F.

Once into the coherent bundle 50, image L' is guided back from sensor head 28 to the remotely located receive end 30. At the output end of coherent bundle 50, the light from L' is collected by third lens means 52 and reformed as image L" on suitable detector means 54. In accordance with a presently preferred embodiment of the present invention, a filter 56 is placed between a pair of lenses comprising lens means 52 in order to remove any ambient light that may have been collected by coherent bundle 50.

An alternative approach of utilizing such lenses 52 with relay L' would be to simply butt the detector 54 directly to the output end of coherent bundle 50. Such a configuration would obviously have the advantages of simplicity of design and compactness of size. However, it should be noted that the direct coupling of the output end of the coherent bundle 50 to the detector 54 is not only technically difficult and expensive, but also does not leave room for a filter, such as filter 56, resulting in a system more sensitive to ambient light.

The purpose of detector 54 is to collect image L", and to transmit signals indicative of the relative position of image L" on the detector 54. As such, detector 54 may suitably comprise a linear array, an area array, or a video tube. In applications involving the measurement of a transparent object, for example glass, the interior or rear surfaces of such transparent objects can cause images in addition to image L" on detector 54. For this reason, each detector 54 preferably comprises a discrete array sensor, since array sensors can distinguish L" from those additional images produced by the interior or rear surface of a transparent object. Furthermore, by measuring the position of these additional images and comparing them to the position of L", thickness of the transparent object can be inferred. If, on the other hand, the ranging application involves an opaque object, or a sufficiently uniform and thick transparent object, whereby images in addition to L" will not be formed on detector 54, detector 54 may alternatively comprise an analog position sensitive diode (PSD). Such PSD's provide significant advantages in their simplicity of electronics and speed, although they can introduce a slight amount of calibration drift due to their analog nature.

After detection, the signals resulting from the relayed image L" are conditioned, amplified, and digitized by conventional signal processing electronics 58. The digitized image is then transferred to a processor 60 to provide a first estimate of the side-to-side position of L" on detector 54. Means for estimating this position are well known in the art. Examples of such means for estimating are described in U.S. Pat. No. 4,658,368 and U.S. Pat. No. 4,708,483, both of which are incorporated herein by reference. After the side-to-side position of L" is estimated, processor 60 then infers range to surface S by use of a known distance-to-position relation which may be stored in processor 60, either as a polynomial or as a lookup table.

Figure 5:
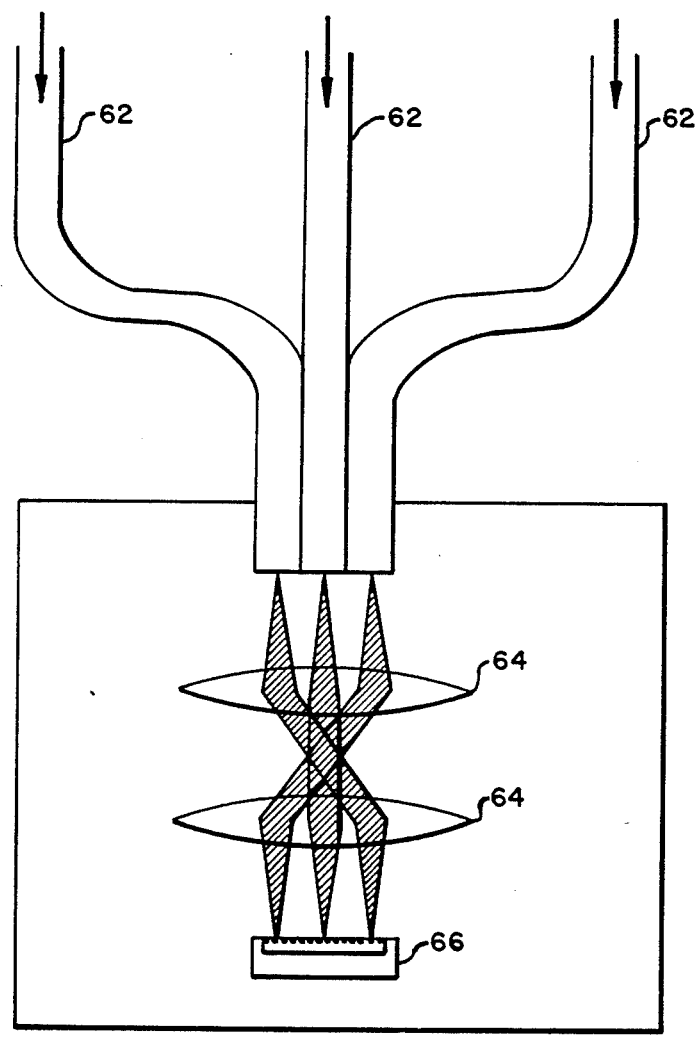
FIG. 5 is a diagrammatic illustration of an alternative detection end arrangement, where multiple coherent bundles share a common detector, in accordance with another embodiment of the present invention.

Referring to FIG. 5, another configuration for receive end 30 is shown. In such a configuration, the output ends of a plurality of coherent bundles 62 are placed next to each other, and are relayed together by lenses 64 to a shared detector 66. As is the case with the receive end 30 that is shown in FIG. 3, the output ends of the coherent bundles 62 may also be directly coupled to detector 66. In either case, such a shared configuration can significantly reduce the amount of electronics required, such for example as detectors 54, signal processing electronics 58, and processors 60 shown in FIG. 3, thereby providing significant cost, size and robustness advantages.

As has been described thus far with reference to FIGS. 3, 4 and 5 sensor heads 28 measure range at a single range point. However, and referring now to FIG. 6, it can be seen that an array 68 of sensor heads 70, 72 and 74 may be utilized in accordance with the present invention to characterize the curvature of an object such as television panel PL. In such an embodiment, television panel PL is characterized along one axis, relative to which the sensor heads 70, 72 and 74 are juxtaposed. At least three sensor heads 70, 72 and 74 are optically coupled by first fiber optic means, preferably in the form of a single mode optical fiber 76, to a remotely located source of light 78, and by second fiber optic means 80 to a receive end 82.

As is shown in FIG. 6, one of the sensor heads, sensor head 72, is disposed parallel to the single axis under consideration, equidistant between the other two sensor heads 70 and 74. Each of sensor heads 70, 72 and 74 is, therefore, adapted to measure the range to a given point on the panel PL. Subtracting an averaged range of the sensor heads 70 and 74 from the range determined by sensor head 72 conveniently provides a single number characterizing the overall curvature of the panel PL, as is well known from the contacting technique of diopter ranging.

In order to characterize the curvature of the panel PL along two dimensions, a third reference sensor head, not shown, that is not disposed colinear with sensor heads 70 and 74 must be added to define a reference plane. A more complete characterization of the curvature of a surface such as that of panel PL may be accomplished in accordance with the present invention by using as many additional sensor heads as space permits.

A single, scanning sensor head could be used as alternative apparatus for characterizing the curvature of a surface. However, utilizing a plurality of sensor heads simultaneously yields a number of benefits which are consistent with placement of such apparatus on a manufacturing line. First, since no mechanical transit times are involved with the apparatus and methods according to the present invention, such apparatus can acquire the range data very quickly, typically in less than one second, thus allowing the apparatus to keep up with the typical manufacturing line speeds. Second, since all data is acquired simultaneously, any motion of the surface can be "frozen" out in a manner similar to that of strobe lights which appear to stop moving objects. Finally, an apparatus utilizing a plurality of sensor heads avoids use of translation stages and other moving parts associated with prior art triangulation gages, thereby avoiding maintenance liabilities incurred in extremely difficult environments, such as those which are typical to the glass manufacturing processes.

The present invention has been particularly shown and described with reference to preferred embodiments thereof, however, it will be understood by those skilled in the art that various changes in the form and detail may be made therein without departure from the true spirit and scope of the invention as defined by the following claims.

What is claimed is:

1. A triangulation sensor comprising:
 a source of light;
 first fiber optic means, coupled to said source, for projecting a beam of said light toward an object surface to form a light spot on said surface;
 a coherent bundle of optical fibers having an input face and an output face, disposed in operative relationship with said first fiber optic means and said object for receiving an image of said light spot from said object;
 lens means for imaging said light spot onto said input face of said coherent bundle;
 position detecting means comprising a detector array optically coupled to said coherent bundle at said output face, said array producing a plurality of signals indicative of the distance from the sensor to said object; and
 means coupled to receive said signals from said array for determining said distance from said sensor and operatively associated with said coherent bundle for ranging said object proximate to said light spot by means of the position of said image on said position detecting means.

2. The triangulation sensor of claim 1 wherein said light comprises monochromatic light.

3. The triangulation sensor of claim 1 wherein said source comprises a laser having a predetermined wavelength.

4. The triangulation sensor of claim 1 wherein said light has a predetermined wavelength and wherein said first fiber optic means comprises,
 a single mode optical fiber adapted to operate at said predetermined wavelength, and
 means, coupled to said single mode optical fiber for collimating said light from said source.

5. The triangulation sensor of claim 4 wherein said collimating means comprises a graded index lens.

6. The triangulation sensor of claim 1 wherein said coherent bundle comprises a coherent linear bundle.

7. The triangulation sensor of claim 1 wherein said coherent bundle comprises a coherent area bundle.

8. The triangulation sensor of claim 1 wherein said position detecting means comprises an analog sensing detector.

9. The triangulation sensor of claim 1 wherein said input face of said coherent bundle is formed at a predetermined angle disposed at the focal plane of said lens means thereby satisfying the Scheimpflug condition.

10. The triangulation sensor of claim 1 wherein said output face of said coherent bundle is directly coupled to said position detecting means.

11. The triangulation sensor of claim 1 wherein said output face of said coherent bundle is optically coupled to said position detecting means through a collimating lens disposed perpendicularly to an optical axis at said output face of said coherent bundle, a laser line filter coupled to receive an image from said collimating lens, and a refocusing lens to focus said image upon said detecting means.

12. The triangulation sensor of claim 1 wherein said fibers of said coherent bundle are formed at a predetermined angle relative to said input face for receiving said image of light spot substantially parallel to said fibers.

13. An apparatus for measuring curvature of a surface comprising:
 a source of light having a predetermined wavelength;
 a pair of sensor heads disposed substantially parallel to said surface along a predetermined reference axis;
 at least one other sensor head disposed along said reference axis;
 each said sensor head being optically coupled to said source and including first fiber optic means for projecting a focused beam of said light towards said surface to form a light spot, and a coherent bundle of optical fibers having input and output faces for receiving an image of said light spot;
 detecting means comprising a detector array optically coupled to said coherent bundle at said output face, said array producing a plurality of signals indicative of the distance from the sensor to said object;
 means coupled to receive said signals from said array for determining said distance from said sensor and operatively associated with each said sensor head through its respective coherent bundle;
 first processing means operatively associated with said detecting means for determining the range of each said sensor head to a point upon said face at which its respective light spot is formed; and
 second processing means operatively associated with said first processing means for determining the ranges to said reference axis and for determining the curvature of said surface by referencing the ranges determined by said at least one other sensor head to said reference axis.

14. The apparatus of claim 13 wherein said first fiber optic means comprises,
 a single mode optical fiber adapted to work at said predetermined wavelength, and
 means coupled to said single mode optical fiber for collimating said light from said source.

15. The apparatus of claim 13 further comprising
 lens means for imaging said light spot and for operatively coupling said image to said coherent bundle.

16. The apparatus of claim 15 wherein said source of light comprises a laser.

17. The apparatus of claim 16 further comprising,
 a collimating lens disposed substantially perpendicularly to an optical axis at said output face of said coherent bundle,
 a laser line filter operatively associated therewith to receive an image from said collimating lens, and
 a refocusing lens to focus said image upon said detecting means.

18. An apparatus for measuring curvature of a surface with respect to a predetermined plane comprising:
 a source of light;
 at least three sensor heads disposed non-colinearly in a plane substantially parallel to the surface;
 at least one additional sensor head operatively disposed with respect to said at least three sensor heads;
 each said sensor head being coupled to said source and including first fiber optic means for projecting a focused beam of said light towards said surface to form a light spot, and a coherent bundle of optical fibers having input and output faces for receiving an image of said light spot;
 detecting means comprising a detector array optically coupled to said coherent bundle at said output face, said array producing a plurality of signals indicative of the distance from the sensor to said object; means coupled to receive said signals from said array for determining said distance from said sensor and operatively associated with each said sensor head through its respective coherent bundle;

first processing means operatively associated with said detecting means for determining the range of each said sensor head to a point upon said surface at which its respective light spot is formed; and second processing means operatively associated with said first processing means for determining the ranges to said plane and for determining the curvature of said surface by referencing the ranges determined by said at least one additional sensor head to said plane.

19. A non-contacting method of determining curvature of a surface comprising the steps of:

providing a source of light at a location remote from said surface;

conducting said light from said source through a first fiber optic means to a sensor array including at least three sensor heads juxtaposed to the surface along a predetermined reference axis;

projecting a beam of said light from each said sensor head towards said surface thereby forming a spot on said surface for each said sensor head;

receiving at each said sensor head a reflection of its respective spot;

providing second fiber optic means for each said sensor head, said second fiber optic means including at an input end thereof a surface in a predetermined plane;

focusing each said spot upon said input end surface of its respective second fiber optic means;

conducting each said images through its respective second fiber optic means to a location on said detecting means disposed at a remote location, wherein said position detecting means provides output data corresponding to a range of values of said sensor head from said surface;

providing a detector array optically coupled to said second fiber optic means at said output face, said array producing a plurality of signals indicative of the distance from the sensor to said object; and receiving said signals from said array for determining said distance from said sensor.

20. The method of claim 19 wherein said input end of said second fiber optic means is formed at a predetermined angle and is disposed at the focal plane of said lens means thereby satisfying the Scheimpflug condition.

21. A non-contact method of determining the thickness of a transparent object having an inner and an outer surface comprising the steps of:

providing a source of light at a location remote from said object;

conducting said light from said source through first fiber optic means to sensor head in a juxtaposed position to said object along a predetermined reference axis;

projecting a beam of said light from said sensor head towards said object thereby forming a well-defined spot on said outer surface and at least one other spot on said inner surface;

receiving at said sensor head a reflection of said spots, providing second fiber optic means for said sensor head, said second fiber optic means including at an input end thereof an input surface in a predetermined plane, focusing an image of each said spot upon said input surface of said second fiber optic means;

conducting each said image through said second fiber optic means to a position detecting means at a remote location, wherein said position detecting means provides output data corresponding to a range of values of said sensor head from said inner and outer surfaces;

providing a detector array optically coupled to said second fiber optic means at said output face, said array producing a plurality of signals indicative of the distance from the sensor to said object; and receiveing said signals from said array for determining said distance from said sensor.

* * * * *